United States Patent [19]
Marko

[11] 3,850,332
[45] Nov. 26, 1974

[54] PORTABLE CARGO BULKHEAD

[76] Inventor: Ortho S. Marko, 598 Barbara Dr., Tipp City, Ohio 45371

[22] Filed: May 18, 1973

[21] Appl. No.: 361,478

Related U.S. Application Data

[63] Continuation-in-part of Ser. No. 224,902, Feb. 9, 1972, abandoned.

[52] U.S. Cl. .............................. 220/22, 105/376
[51] Int. Cl. ........................................ B65d 1/24
[58] Field of Search ............ 220/22, 22.1, 22.2, 1.5; 217/31; 160/351, 135; 52/238, 240; 105/369 B, 376; 296/24 R

[56] References Cited
UNITED STATES PATENTS

| | | | |
|---|---|---|---|
| 1,755,729 | 4/1930 | Goetz | 105/376 |
| 2,565,997 | 8/1951 | Stone | 296/24 R |
| 2,594,208 | 4/1952 | Pilot | 105/376 |
| 2,594,864 | 4/1952 | Buckland | 160/351 |
| 2,674,207 | 4/1954 | Kerbaugh | 105/376 |
| 3,044,800 | 7/1962 | Wicker | 296/24 R |
| 3,059,593 | 10/1962 | Mack | 105/369 B |
| 3,413,932 | 12/1968 | Bennett | 105/376 |

Primary Examiner—William I. Price
Assistant Examiner—Steven M. Pollard
Attorney, Agent, or Firm—Eugene C. Goodale

[57] ABSTRACT

A portable cargo bulkhead for separating and securing cargo in an enclosure, such as a container, van or the like, comprises a durable open mesh material carried by an outer frame, the frame being slightly smaller than the dimensions of the enclosure. Friction engaging pads are movably mounted on said frame for engaging the wall of the enclosure, the pads being movable into and out of engagement with the walls. The bulkhead is swingably mounted to a stanchion to permit pivoting of the bulkhead at one side of the enclosure.

10 Claims, 10 Drawing Figures

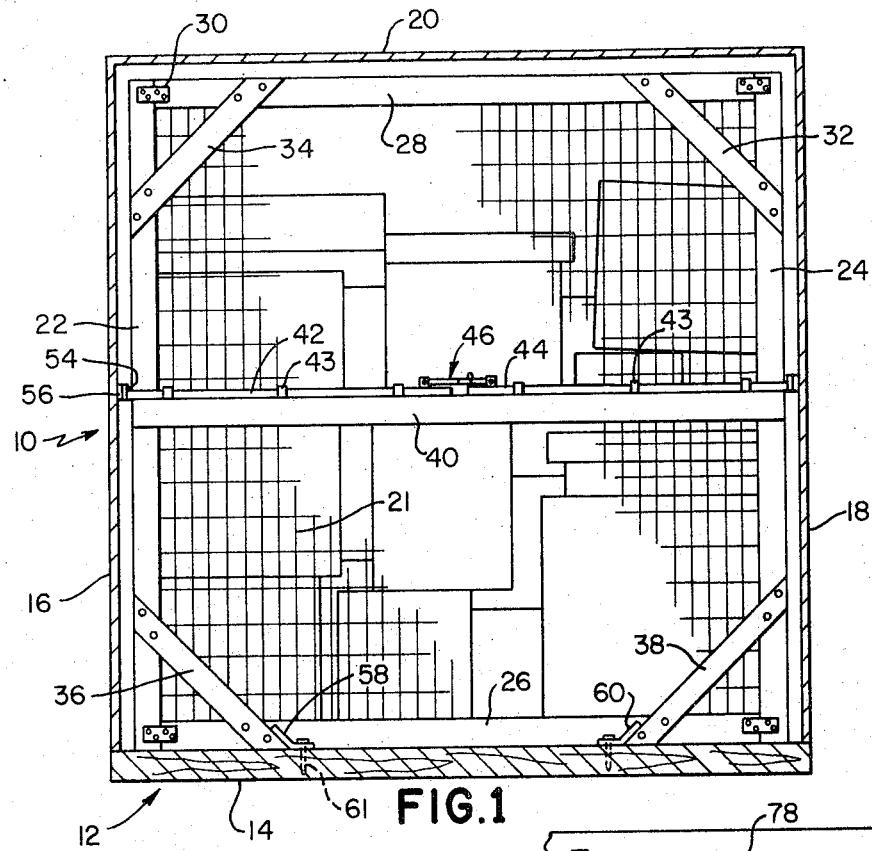

3,850,332

PORTABLE CARGO BULKHEAD

This application is a continuation in part of Ser. No. 224,902, filed Feb. 9, 1972, now abandoned.

BACKGROUND OF THE INVENTION

This invention relates to bulkheads and more particularly to a portable cargo bulkhead. There is a need in the trucking industry for a means to efficiently and effectively secure non-uniform pieces of cargo during shipment. In addition, there is a liability problem on the part of the trucking industry resulting from miscounts of cargo and pilferage. A further problem exists in separating goods having different destinations but which are to be shipped in the same van.

Accordingly, it is an object of this invention to provide a lighweight yet sturdy portable cargo bulkhead, easily handled by one man, having general utility for any enclosure such as a container, van or the like.

A further object of this invention is to provide a portable cargo bulkhead which may be located and sealed into place thereby preventing access to the cargo until the seal is broken.

A still further object of this invention is to provide a portable cargo bulkhead which is pivotal about a stanchion for ease in filling or unloading the enclosure.

Yet another object of this invention is to provide a portable cargo bulkhead having means for frictionally engaging the walls of the enclosure to secure the cargo against movement.

Yet another object of this invention is to provide a portable cargo bulkhead through which the cargo may be visually observed.

An additional object of this invention is to provide a portable cargo bulkhead which is of simple and economical construction, is easy to operate and does not require modifications to existing enclosures, containers, vans or the like.

SUMMARY OF THE INVENTION

This invention provides a portable cargo bulkhead which has general utility and use for providing temporary bulkheads against cargo carried in an enclosure such as a container, van or the like. The bulkhead is comprised of an open mesh material carried by an outer frame. Friction engaging pads are provided for engaging the walls of the enclosure and means for moving the pads into and out of engagement with the walls are provided. The bulkhead is pivotal about a stanchion which is adjustably secured near one wall.

Other objects, details, uses and advantages of this invention will become apparent as the following description of the exemplary embodiments thereof presented in the accompanying drawings proceeds.

BRIEF DESCRIPTION OF THE DRAWINGS

The accompanying drawings show present exemplary embodiments of this invention in which:

FIG. 1 is an elevational view illustrating one exemplary embodiment of this invention showing the bulkhead in place within the enclosure;

FIG. 2 is an enlarged view showing the actuating and sealing mechanism in the closed or sealed position;

FIG. 3 is an enlarged view similar to FIG. 2 showing the actuating and sealing means in the opened position; and FIG. 4, 5 and 6 are fragmentary views similar to FIG. 2 illustrating other exemplary embodiments of this invention and particularly illustrating different actuating and sealing means.

DESCRIPTION OF THE ILLUSTRATED EMBODIMENTS

Figure 7:
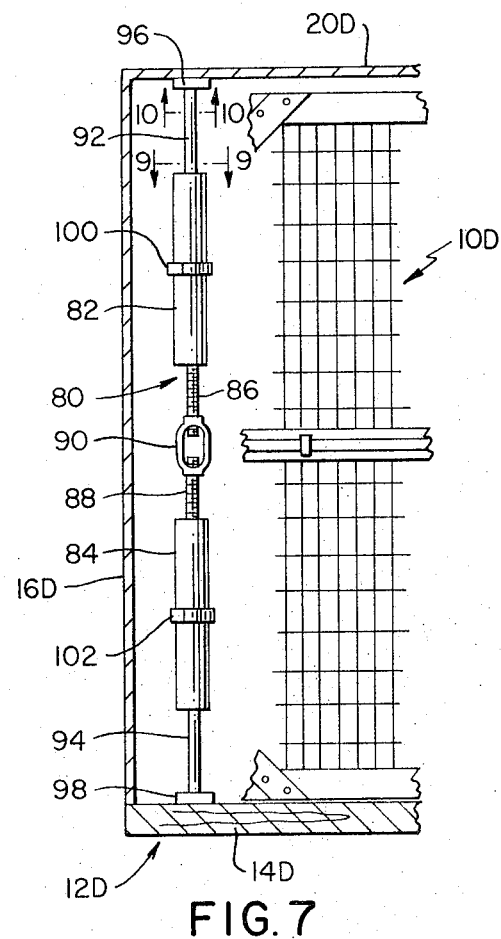
FIG. 7 is a fragmentary view, partially broken away, similar to FIG. 1 illustrating another exemplary embodiment of this invention particularly showing the stanchion which permits pivoting of the bulkhead.
Figure 8:
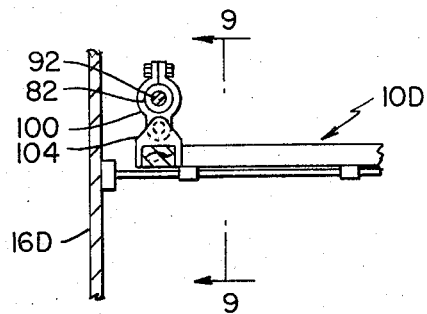
FIG. 8 is a view taken along line 8—8 of FIG. 7.

Reference is now made to FIG. 1 of the drawings, which illustrates one exemplary embodiment of the portable cargo bulkhead of this invention, which is designated generally by the reference numeral 10. The bulkhead 10 is shown in place within any suitable enclosure 12, such as a container, van or the like. For puroses of describing this invention, it will be assumed that the enclosure 12 is a van such as is used by motor freight companies and the trucking industry for shipping cargo of all types. The enclosure 12 is comprised of a floor 14, such floor being of wood, walls 16 and 18 and a roof 20.

The bulkhead 10 is comprised of any suitable open mesh material 21, such as fabric-weld steel fencing, secured to an outer framework of peripheral members 22, 24, 26 and 28. For this illustrative embodiment the peripheral frame and members to be described hereinbelow are made of wood. However, it should be noted that the frame may be made from any suitable material, such as aluminum, etc., so long as the material provides the necessary strength needed for the bulkhead. To provide added stability and strength to the peripheral frame, scabs 30 are secured to each corner, as well as corner braces 32, 34, 36 and 38. The scabs and braces may be secured to the peripheral frame by any means such as nails, screws or the like.

A middle brace 40 is connected between peripheral frame members 22 and 24. Mounted for sliding movement relative to the brace 40 is a pair of elongated bars 42 and 44. The bars 42 and 44 are secured to the brace 40 by any suitable means such as a plurality of brackets 43. It is seen that the bars 42 and 44 are mounted parallel to the brace 40 and, hence, the movement to be described hereinbelow is parallel to the brace 40.

Movement of the bars 42 and 44 results from the opening or closing of any suitable actuating means 46 as best seen in FIGS. 2 and 3. In the illustrative embodiment shown, the actuating means 46 is comprised of arms 48 and 50 which are pivotally connected together at 45. One end of arm 48 is pivotally connected to the bar 42 through a bracket 47 and one end of the arm 50 is pivotally connected to the bar 44 by bracket 49. As best seen in FIG. 3, the bars 42 and 44 will be drawn closer together when the actuating means 46 is opened to the position shown. Upon closing of the actuating means 46 (FIG. 2) the bars 42 and 44 will be urged outwardly away from each other. Apertures 51 and 53 are formed respectively in arms 48 and 50 such that the apertures will be aligned with one another when the actuating means 46 is in the closed position. In this position, any suitable locking or sealing means, such as a sealing band 52 or the like may be inserted through the apertures. In this manner, the actuating means 46 may not be moved to the open position until the seal has been broken and removed.

An enlarged backing member 54 is mounted to the outer end of each bar 42 and 44. A suitable friction engaging pad 56 is secured to each backing member 54. The friction engaging member 56 may be any suitable material which is slightly compressible and has good friction engaging qualities such as rubber or the like. Referring again to FIG. 1, it can be seen that the dimension of the peripheral frame of the bulkhead 10 is less than the width between the walls 16 and 18. When the actuating means is in the closed position the bars 42 and 44 have been urged outwardly and pads 56 frictionally engage the walls 16 and 18. When the actuating means 46 is opened, the pads 56 are retracted from engagement with the walls and the bulkhead 10 may be moved. It may be noted that the member 54 and pad 56 are larger than the dimension of the bars 42 and 44. This permits a greater area to engage the walls of the enclosure to provide a greater resistance to shifting movement of any cargo which might act against the bulkhead 10.

To further assist in preventing movement of the bulkhead 10 due to shifting or movement of the cargo, suitable brackets or the like 58 and 60 are mounted respectively on corner braces 36 and 38. The brackets 58 and 60 are formed with an aperture in the floor engaging leg portion thereof so that spikes or the like 61 may be driven therethrough. Although the brackets 58 and 60 are shown as being mounted to the braces 36 and 38, a similar type bracket or hinge might be mounted to the frame 26.

In operation, the enclosure 12 is loaded with the desired cargo. The cargo, be it a partial load or a full load, is stacked in a floor-to-roof manner. The bulkhead 10, with the actuating means 46 in the open position is carried into the enclosure 12 and placed in abutting relationship to the cargo. The actuating means 46 is moved to the closed position thereby urging the pads 56 into frictional engagement with the walls 16 and 18. Spikes or the like 61 may be driven through the brackets 58 and 60 to further hold the bulkhead 10 in place. A lock or sealing band may now be placed through the apertures in the actuating means 46. Thus, the cargo may not be reached until the seal or lock has been removed and the bulkhead 10 moved.

Another exemplary embodiment of the actuating means of this invention is illustrated in FIG. 4. Only a fragmentary view is illustrated and parts similar to the parts shown in FIGS. 1–3 will be designated by the same reference numeral followed by the letter designation "A" and not described again. In this embodiment, the rods 42A and 44A are mounted by brackets or the like 43A to the side of brace 40A. A suitable cam member or the like 62 is pivotally mounted to the brace 40A between the ends of the rods 42A and 44A. The cam 62 is pivotally connected to the rods 42A and 44A by links 64 and 66 respectively. A handle 68 permits rotation of the cam member 62. Thus, as the cam member 62 is rotated in a clockwise direction (from the position shown in FIG. 4), the links 64 and 66 will urge rods 42A and 44A in the outward direction. When the cam is rotated in the counterclockwise direction or rotated further in the clockwise direction, i.e., from approximately 90° to 180° as seen in FIG. 4, the rods 42A and 44A will be retracted or moved towards each other. Any suitable means for locking and sealing the handle may be provided. As an example, an aperture or slot 70 may be formed in the handle 68 to receive a staple or the like 72 (secured to the bar 44A) when the handle is moved to the closed position, i.e., parallel with the brace 40A. A suitable lock or sealing band (not shown) may be inserted through the staple 72 to secure the handle 68.

Another exemplary embodiment of a suitable actuating means for use in this invention is illustrated in FIG. 5 of the drawings. Parts which are similar to corresponding parts hereinbefore described will be designated by the same reference numeral followed by the letter designation "B" and not described again. The main difference between the embodiments of FIG. 4 and FIG. 5 is that in FIG. 5 the cam 74 engages the ends of the rods 42B and 44B to urge said rods in the outward direction. The cam 74 is pivotally mounted to the brace 40B and handle 76 is connected with the cam 74 so that rotation of the handle causes a like rotation of the cam. The view shown in FIG. 5 is in the nonengaging position. The handle 76 is rotated in a clockwise direction to bring the cam surfaces in contact with the rods 42B and 44B. The handle 76 may be secured in the pad engaging position by any suitable means as hereinbefore described. When the handle 76 is returned to the opened position or non-pad engaging position, it is only necessary to jiggle the bulkhead 10 to disengage the pads from the walls so that the bulkhead may be removed.

A further exemplary embodiment of a suitable actuating means useful for this invention is illustrated in FIG. 6 and parts which are similar to corresponding parts already described will be designated by the same reference numeral followed by the letter designation "C" and not described again. In this embodiment a turnbuckle or the like 78 is connected by any suitable means between the ends of the rods 42C and 44C. Thus, rotation of the turnbuckle will urge the rods 42C and 44C towards and away from each other.

Another exemplary embodiment of a portable cargo bulkhead is illustrated in FIG. 7 of the drawings. Parts which are similar to corresponding parts hereinbefore described will be designated by the same reference numeral followed by the letter designation "D" and not described again. The main difference between the embodiments of FIGS. 1 and 7 is that in the FIG. 7 embodiment the bulkhead 10D is pivotally mounted to a stanchion designated generally as 80.

The stanchion 80 is seen to comprise an upper portion 82 and a lower portion 84 separated by a pair of lead screws or shafts 86 and 88, respectively. The shafts 86 and 88 are coupled together by a turnbuckle 90. A ceiling engaging pad or the like 96 is supported on a shaft 92 which projects from the opposite end of the upper portion 82. Similarly, a floor engaging pad 98 is supported on shaft 94 which projects from the lower portion 84 of the stanchion 80. To set up the stanchion 80, the turnbuckle 90 is rotated to draw the lead screws 86 and 88 towards one another which produces a clearance between the pads 96 and 98 and ceiling 20D and floor 14D of the enclosure 12D. When the stanchion 80 is in the proper position, the turnbuckle is rotated in the reverse direction which urges the lead screws 86 and 88 apart thereby urging the respective pads into engagement with the ceiling and floor. As seen in FIG.

10, the ceiling pad 96 is of a large rectangular shaped construction. This permits the general use of this stanchion and pad in the majority of trucks, even those trucks having ribbed type ceilings. In addition, the large area transmits the engaging force over the entire area so as to not punch a hole in the ceiling of the truck.

Figure 9:
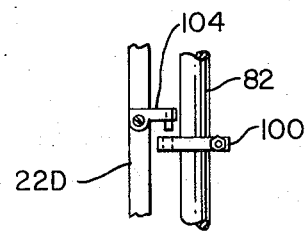
FIG. 9 is an exploded fragmentary view taken along line 9—9 of FIG. 8.
Figure 10:
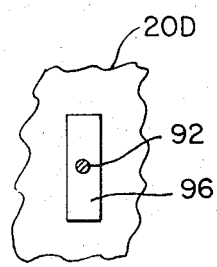
FIG. 10 is a view taken along line 10—10 of FIG. 7.

Hinge members 100 and 102 are respectively secured on the upper portion 82 and lower portion 84. These hinged members may be secured by any suitable means such as bolts or the like, said bolts being of the type which can be loosened to permit relative vertical adjustment of the respective hinged members. As seen in FIG. 9, the vertical peripheral frame member 22D has a pair of cooperating hinge members 104 (only one shown) secured thereon by suitable means such as a bolt or the like. Any suitable hinge members may be utilized. In the illustrative embodiment shown, the hinge members are of the type wherein one member has an aperture therethrough for receipt of a projecting protrusion from the other member. Thus, once the stanchion 80 is in place, the bulkhead 10D can be brought into place and the protrusions of the hinge members 104 can be inserted into the apertures of the respective hinge members 100 and 102. It is further seen that the stanchion 80 is positioned away from the wall 16D of the enclosure 12D and is further positioned at right angles to the bulkhead 10D. This will permit the bulkhead 10D to be pivotally swung about the hinge members to a full open position adjacent the wall 16D. The bulkhead 10D, when swung to the closed position, may be secured in place as hereinbefore described. Thus, when it is desired to make a partial unload of some of the cargo, the bulkhead 10D need not be completely removed. The bulkhead 10D may be unlocked and swung about the stanchion 80. When the cargo has been removed the bulkhead 10D may be swung back into place and locked thereby securing the cargo once again against theft.

It can be seen that this invention provides a portable cargo bulkhead which has universal application and no modifications of existing enclosures are needed. The bulkhead is of simple and economical construction, is easily maneuverable and pivotal by one man, secures cargo and holds the cargo against movement and prevents pilferage of the cargo. Accordingly, the objectives hereinbefore set forth have been accomplished.

While present exemplary embodiments of this invention have been illustrated and described, it will be recognized that this invention may be otherwise variously embodied and practiced by those skilled in the art.

What is claimed is:

1. A portable cargo bulkhead for use in an enclosure such as a container, van or the like comprising:
   a peripheral frame being of slightly smaller dimension than the internal dimension of the enclosure;
   cargo retaining means secured internally from said peripheral frame;
   a horizontal brace connected between opposed frame members;
   a pair of elongated rods mounted on said brace for slidable movement therealong;
   friction engaging pads attached to the outer end of each of said rods;
   actuating means having open and closed conditions, said actuating means connected to each of said rods for moving said rods relative to said brace wherein said engaging pads are moved from a nonengaging position to an engaging position whereby said engaging pads frictionally engage the walls of the enclosure in the engaging position;
   a vertically adjustable stanchion for mounting in the enclosure adjacent one side of the enclosure, said stanchion having ceiling and floor engaging members for respectively engaging the ceiling and floor when said stanchion is adjusted wherein said stanchion is independently and self-supportingly secured in a vertical position; and
   pivot means detachably connecting said frame with said stanchion wherein said frame may be pivoted about said stanchion when said engaging pads are in the nonengaging position and wherein said frame may be detached from said stanchion with said stanchion remaining in position.

2. The portable cargo bulkhead as set forth in claim 1 in which said pivot means includes a two-piece hinge member, said members being detachable one from the other, one of said hinge members being secured to said stanchion and the other hinge member being secured to said frame, said hinge members cooperating one with the other to permit pivotal movement of said frame relative to said stanchion.

3. The portable cargo bulkhead as set forth in claim 2 further comprising enclosure flooor engaging means attached to said frame and securing said frame against movement and in which said cargo retaining means is an open mesh material.

4. The portable cargo bulkhead as set forth in claim 3 in which said open mesh material is fabric-weld steel fencing.

5. The portable cargo bulkhead as set forth in claim 2 in which said actuating means comprises first and second arms pivotally connected to one another, each of said arms being respectively pivotally connected to one of said rods wherein pivoting movement of said arms urges said rods towards and away from each other.

6. The portable cargo bulkhead as set forth in claim 5 in which each arm is formed with an aperture therethrough such that when said arms are in the closed conditions the apertures are aligned for receiving a security device.

7. The portable cargo bulkhead as set forth in claim 2 in which said actuating means comprises a cam member pivotally attached to said brace, links connecting each rod with said cam member and a handle connected to said cam for rotating said cam wherein rotation of said cam causes said links to urge said rods toward and away from each other.

8. The portable cargo bulkhead as set forth in claim 7 further comprising lock means cooperating between said handle and one rod wherein said handle can be locked to said rod when said rods are in the expanded position.

9. The portable cargo bulkhead as set forth in claim 1 in which said cargo retaining means is an open mesh material; and
   in which said actuating means comprises first and second arms pivotally connected to one another, each of said arms being pivotally connected to one of said rods, each of said arms being formed with an aperture therethrough such that the apertures are aligned for receiving a security device when said arms are in the closed position; and
   further comprising floor engaging means attached to said frame.

10. The portable cargo bulkhead as set forth in claim 1 in which said cargo retaining means is an open mesh material; and in which said actuating means comprises a cam member pivotally attached to said brace;

links connecting each rod with said cam member; and a handle connected to said cam for rotating said cam wherein rotation of said cam causes said links to urge said rods toward and away from each other; and further comprising lock means cooperating between said handle and one rod wherein said handle can be locked to said rod when said rods are in the expanded position; and floor engaging means attached to said frame for securing the frame against movement.

* * * * *